United States Patent [19]

Kono

[11] 4,110,736
[45] Aug. 29, 1978

[54] SHAPE RECOGNITION SYSTEM

[75] Inventor: Hidehiko Kono, Akishima, Japan

[73] Assignee: Agency of Industrial Science & Technology, Tokyo, Japan

[21] Appl. No.: 757,971

[22] Filed: Dec. 29, 1976

Related U.S. Application Data

[63] Continuation of Ser. No. 560,190, Mar. 20, 1975, abandoned.

[30] Foreign Application Priority Data

Apr. 24, 1974 [JP] Japan .................................. 49-46291

[51] Int. Cl.$^2$ .............................................. G06K 9/12
[52] U.S. Cl. ................. 340/146.3 AE; 340/146.3 AC
[58] Field of Search ............ 340/146.3 AE, 146.3 AC

[56] References Cited

U.S. PATENT DOCUMENTS

| 3,863,218 | 1/1975 | Oka et al. ..................... 340/146.3 AE |
| 3,899,771 | 8/1975 | Saraga et al. ............... 340/146.3 AE |

OTHER PUBLICATIONS

Hosking, "A Contour Method for the Recognition of Handprinted Characters", *Conf. Proceedings on Machine Perception of Patterns*: England, 4–72, pp. 19–27.
Sakai et al., "Extraction of Invariant Picture Sub-Structures by Computer", *Comp. Graphics & Image Processing*, vol. 1, No. 1, 4–72, pp. 81–96.

*Primary Examiner*—Leo H. Boudreau
*Attorney, Agent, or Firm*—Haight & Huard

[57] ABSTRACT

An apparatus for separating the signals of an internal shape from the signals of an external shape for use in a shape recognition system.

3 Claims, 13 Drawing Figures

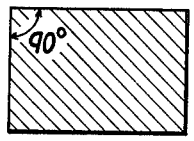 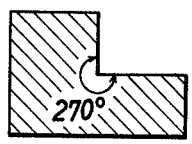 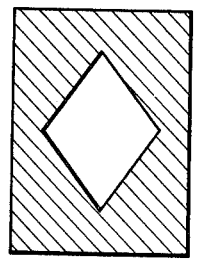
FIG.1a   FIG.1b   FIG.2
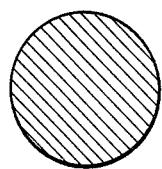 
FIG.6
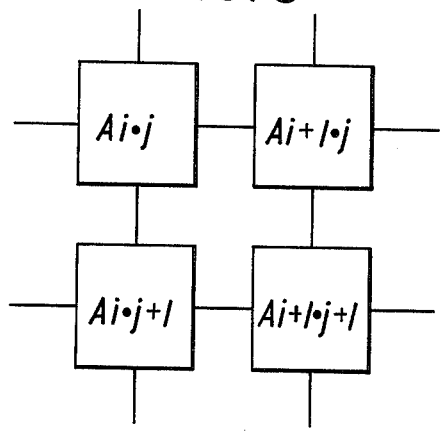
FIG.7
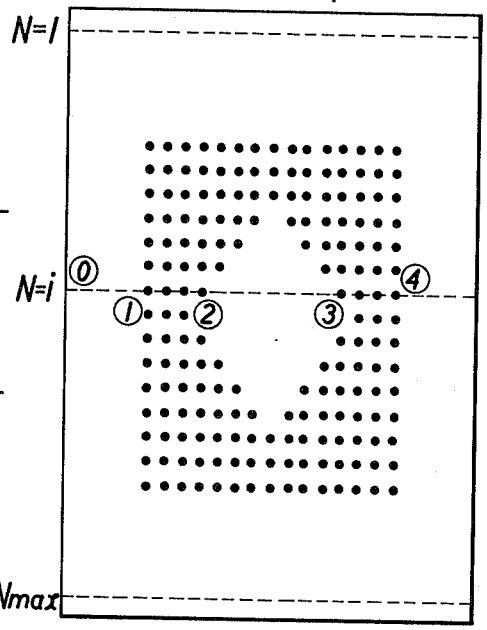
FIG.10
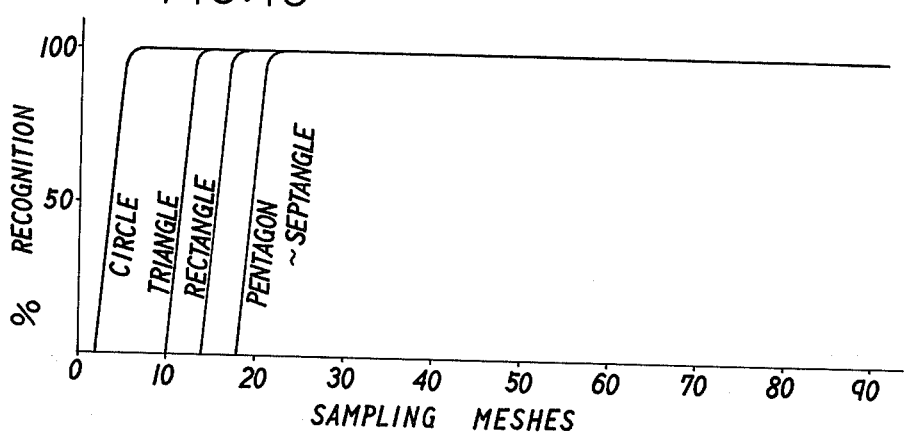

FIG. 8a
FIG. 8b
FIG. 9a
FIG. 9b
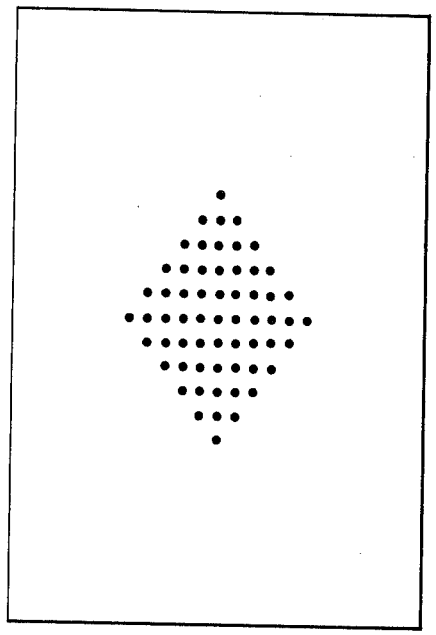
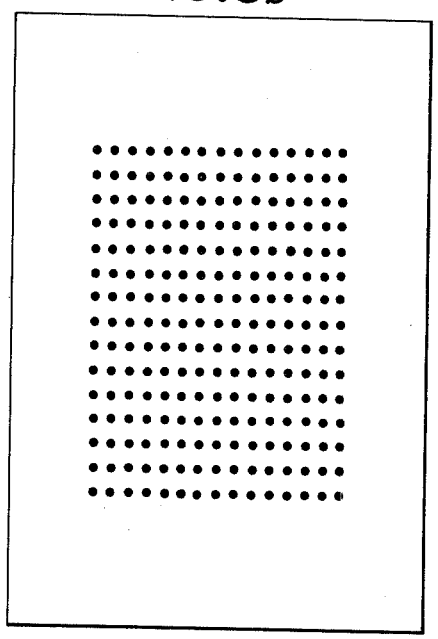
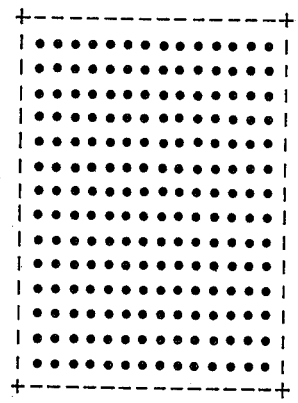

SHAPE RECOGNITION SYSTEM

This is a continuation, of application Ser. No. 560,190, filed Mar. 20, 1975 now abandoned.

BACKGROUND OF THE INVENTION

1. Field of the Invention

The present invention relates to pattern recognition and more particularly to a novel system which is useful in identifying shapes of various objects and patterns.

2. Description of Prior Art

According to a typical prior-art system of pattern recognition, the contour of an object under observation is first analyzed by the spatial analysis, followed by replacement of the analyzed contour line by infinitesimal line segments. Line functions of the line segments are then computed by the method of least squares, thereby to determine the edge lines.

Finding functions for infinitesimal line segments of a contour line, which is an essential part of the prior-art system, invariably involves very complicated time-consuming processes, requiring a sophisticated apparatus. Furthermore, any complicated shapes which are impossible to express in terms of line functions cannot be identified by a system of the type just discussed.

SUMMARY OF THE INVENTION

It is an object of the invention to provide a novel shape recognition system, which overcomes the afore-mentioned shortcomings of the prior-art system.

It is another object of the invention to provide a shape recognition system which can be advantageously employed in identifying shapes of various objects and patterns.

It is still another object of the invention to provide a shape recognition system which eliminates the need to express a contour line in terms of line functions of line elements, facilitating recognition of complicated shapes.

It is a further object of the invention to provide a shape recognition system which can identify shapes in an extremely short period of time.

It is a still further object of the invention to provide a shape recognition system which can reliably identify shapes from minimum sampling data on the objects and patterns.

Still another object of the invention is to provide a shape recognition system which involves relatively simple algorithms.

A further object of the invention is to provide a shape recognition system which can be suitably employed in identifying internal and external shapes of objects and patterns with cavities.

The shape recognition system according to the invention comprises a pattern input unit for feeding shape outline data in terms of binary signals and a pattern recognizing unit for identifying the shape on the basis of the input signals. The pattern recognizing unit as employed in the system has the functions of or includes a means for converting the binary signals to directional signals to determine directions of edge line segments at the contour portions of the shape, a means for analyzing the directional signals at the contour portions of the shape in a manner such as to encircle the contour of the pattern to detect any edge turns of the pattern, and a means for identifying the contour pattern on the basis of the number and locational orientations of the detected edge turns.

With the afore-mentioned system, shapes of objects or patterns are identified in an extremely short period of time, as compared to the prior-art counterparts. Shortening of time required for pattern recognition is particularly desirable for an apparatus intended for use in identification of industrial parts of various shapes. Thus, the system of the invention will find wise use in recognition of shapes or conditions of industrial parts which are undergoing such processes as fabrication, delivery, assembling and inspection for quality control. The system can be additionally employed in an apparatus for verification of part shapes and dimensions in comparison with part lists and drawings, or even in an apparatus for identification of letters and characters.

The pattern recognition system according to the invention can also be advantageously employed in a remote-controlled robot for exploration of under-sea and other remote places to grasp the environmental landscape pattern. In the absence of a system such as of the present invention, the robot has to transmit the environmental pattern data to his operator for assessment. As the robot has to wait for a response from the operator, the operating speed of the robot is invariably slowed down. Where the pattern recognition system of the invention is employed, the robot can treat the environmental pattern data internally with the assistance of a relatively simple apparatus to cope with any obstacles on its way, if necessary, transmitting minimum and only absolutely necessary data to the operator.

The above and other objects, features and advantages of the invention will become clear from the following particular description of the invention and the appended claims, taken in conjunction with the accompanying drawings which show by way of example a preferred embodiment of the invention.

BRIEF DESCRIPTION OF THE DRAWINGS

In the accompanying drawings:

FIGS. 1a, 1b and 2 show examples of patterns to be identified;

FIG. 6 is a schematic view on an enlarged scale illustrating pattern-wise conversion of signals;

FIGS. 7, 8a, 8b, 9a and 9b are schematic views showing respectively the pattern of FIG. 2 as it undergoes successive pattern recognition phases; and FIG. 10 is a graphic representation of the relationship between the number of sampling meshes and the pattern recognition ability with the system of the invention.

PARTICULAR DESCRIPTION OF THE INVENTION

Sakai et al., in Computer Graphics and Image Processing 1 (1): 81–96 (April, 1972) describe a suitable program for performing the broad functions required in accordance with the prior art aspects of the present invention. Suitable means for carrying out these operations are described by Saraga et al. in U.S. Pat. No. 3,899,771, corresponding to British Applications Nos. 38527/71 and 38528/71 of Aug. 17, 1971 and British Application No. 9488/72 of Mar. 1, 1972.

The shape recognition system according to the invention is now described following an operational sequence thereof and with reference to the accompanying drawings which show by way of example a preferred embodiment of the invention.

Shapes of objects from a viewpoint of their identification can be classified in general into two types, such as shown by examples in FIGS. 1a and 1b. The shapes shown in FIG. 1a have no edge turn with an angle of opening of greater than 180° and will be referred to in this specification as convex types. Shapes such as shown in FIG. 1b which have at least one edge turn with an angle of greater than 180° will be referred to as concave types.

There are also shapes which have a hole or cavity, an example of which is shown in FIG. 2. In a shape of the last type, the configuration of the outline will be herein referred to as an external shape while that of the inside cavity will be referred to as an internal shape.

Figure 3:
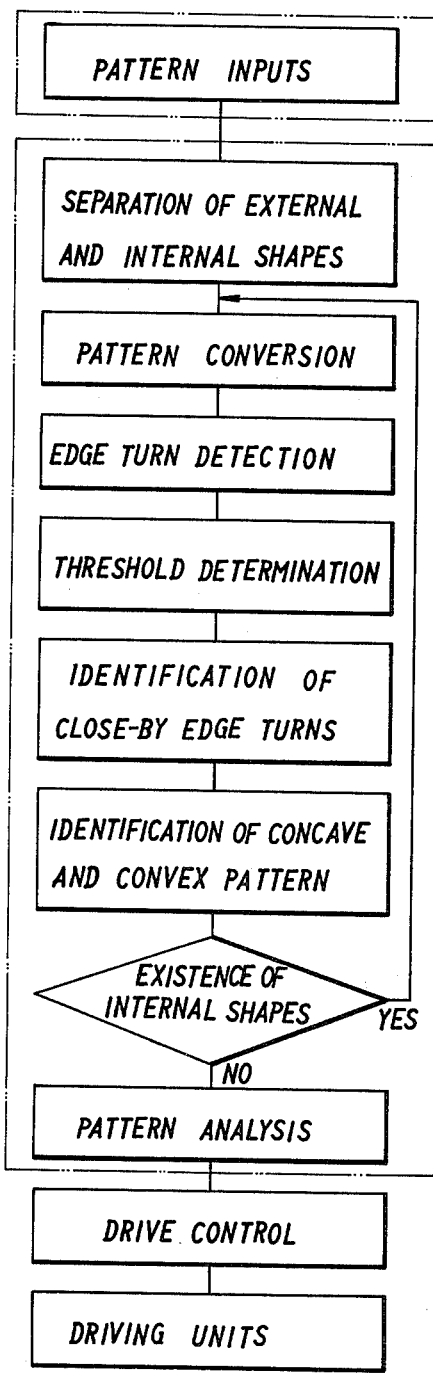
FIG. 3 is a flow chart illustrating the system of pattern recognition according to the invention.

FIG. 3 shows in flow chart the shape recognition system according to the invention. Referring to the figure, an input pattern of a shape under observation is produced by a pattern input unit 1 such as an ITV camera which successively scans the entire shape to be recognized and produces by AD conversion binary signals which define in binary codes the light intensities of individual sample points on the scanning line. Alternatively, a plurality of small sensors which are disposed in a multitude of arrays may be used to produce a pattern-wise data in binary signals. The digitized pattern information is sent to a pattern recognizing unit 2. FIG. 7 shows the pattern of FIG. 2 as it is digitally expressed by binary signals for the purpose of pattern recognition, where the signal 1 is shown by way of example by a dot "." and signal 0 by a blank.

Figure 4:
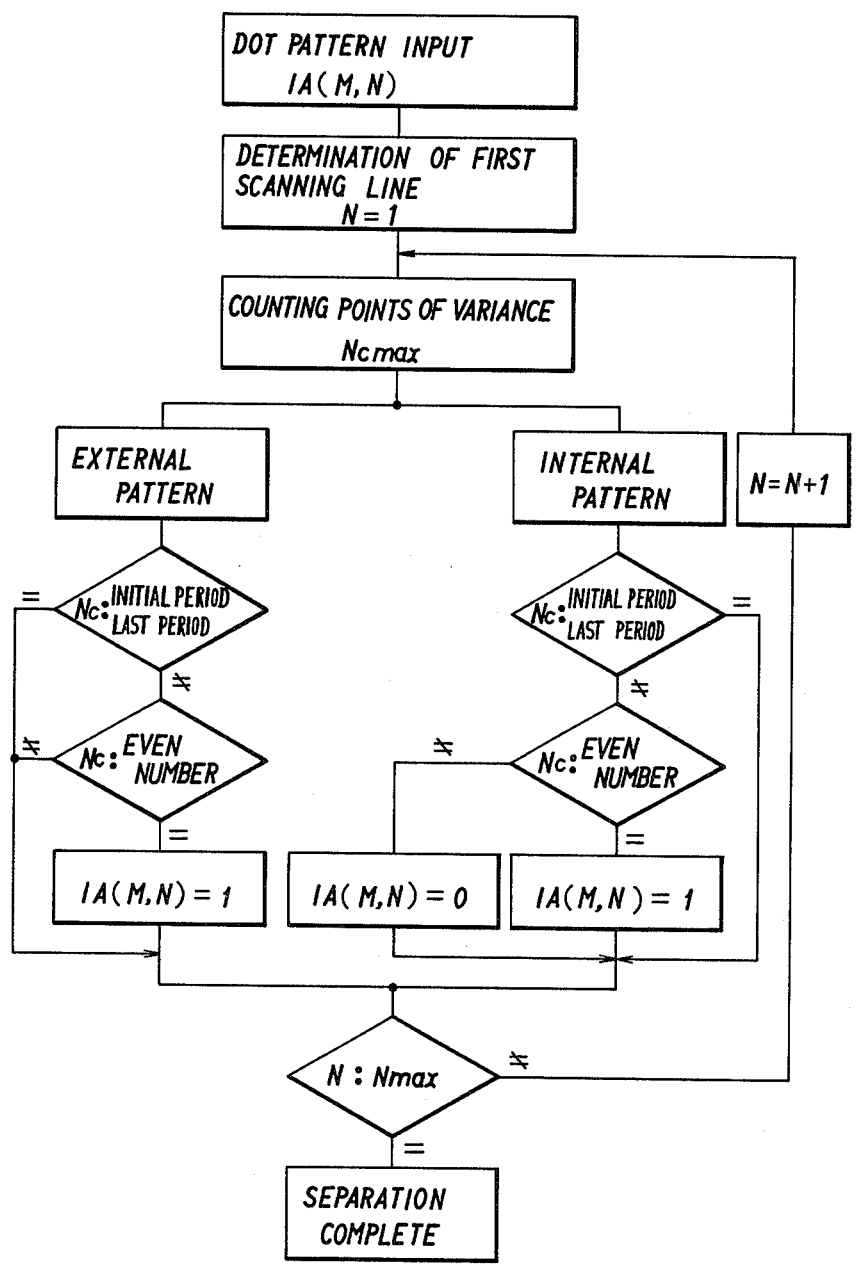
FIG. 4 is a block diagram illustrating external and internal pattern separation procedures.

The separator which separates the internal shape from the external shape determines a first scanning line ($N=1$) and scans the input dot pattern from the first scanning line ($N=1$) as shown in FIG. 4 and counts the number of points of variance from 0 to 1 or vice versa of the binary signals on each scanning line, memorizing a maximum value Ncmax.

For the separation of the external and internal shapes, except for the period of no variance ($Nc=0$) and the period of last variance ($Nc=Ncmax$), the signals in the period of variance of every even-number count are inverted from 0 to 1 ($IA(M,N)=1$) while the signals in the period of variance of every odd-number count are inverted from 1 to 0 ($IA(M,N)=0$). Of course, in the first scanning line ($N=1$), no inversion of signals takes place as the count for the points of variance is zero.

The afore-mentioned counting of the points of variance and signal inversion are carried out sequentially from the first scanning line ($N=1$) to the last scanning line ($N=Nmax$) thereby converting the dot pattern. More particularly, on the scanning line $N=Ni$ of the dot pattern shown in FIG. 7, for example, the signal inversion does not take place in the period of no variance ⓪, while inverting the signals in the period of first variance ① from 1 to 0, the signals in the period of second variance ② from 0 to 1, and the signals in the period of third variance ③ from 1 to 0. As in the period of no variance ⓪, the signals in the period of fourth or last variance ④ do not undergo the inversion.

By sequentially repeating the dot pattern conversion of the respective scanning lines until the last one $N=Nmax$, a separated dot pattern of the internal shape as shown in FIG. 8a may be obtained.

On the other hand, in order to separate the pattern of the external shape from that of the shape to be recognized, the signals on each scanning line from $N=1$ to $N=Nmax$ are, except for the period of no variance ($Nc=0$) and the period of last variance ($Nc=Ncmax$), inverted in the even-number periods of variance but not in the odd-numbered period of variance. As a result, the pattern of the internal shape is erased and a separated dot pattern of the external shape can be obtained as shown in FIG. 8b.

The binary signals are then converted patternwise to carry information regarding directions of edge line segments at the contour portions of the pattern under observation. The conversion is carried out in such a manner that for every mesh point at a contour portion of the pattern its new signal is determined by the binary states (either 0 of 1) of $2 \times 2$ square points therearound, $Ai\cdot j$, $Ai+1\cdot j$, $Ai\cdot j+1$, and $Ai+1\cdot j+1$ as shown in FIG. 6. More specifically, new signals as shown below on the left-hand side are obtained with particular combinations of old signals as expressed by logic statements where $\times$, $+$ and the overline as in $\overline{Ai\cdot j}$ designate logic AND, OR and NOT, respectively.

| | |
|---|---|
| horizontal (−) | $= (\underline{Ai\cdot j} \times \underline{Ai+1\cdot j} \times \overline{Ai\cdot j+1} \times \overline{Ai+1\cdot j+1})$ <br> $+ Ai\cdot j \times Ai+1\cdot j \times Ai\cdot j+1 \times Ai+1\cdot j+1)$ |
| diagonal right (/) | $= (Ai\cdot j \times \overline{Ai+1\cdot j} \times \underline{Ai\cdot j+1} \times Ai+1\cdot j+1)$ <br> $+ (Ai\cdot j \times Ai+1\cdot j \times Ai\cdot j+1 \times Ai+1\cdot j+1)$ |
| diagonal left (\\) | $= \overline{Ai\cdot j} \times Ai+1\cdot j \times Ai\cdot j+1 \times \underline{Ai+1\cdot j+1}$ <br> $+ (Ai\cdot j \times Ai+1\cdot j \times Ai\cdot j+1 \times Ai+1\cdot j+1)$ |
| vertical (\|) | $= (\underline{Ai\cdot j} \times \overline{Ai+1\cdot j} \times \underline{Ai\cdot j+1} \times \overline{Ai+1\cdot j+1})$ <br> $+ Ai\cdot j \times Ai+1\cdot j \times Ai\cdot j+1 \times Ai+1\cdot j+1)$ |
| body (.) | $= (\underline{Ai\cdot j} \times \underline{i+1\cdot j} \times \underline{Ai\cdot i+1} \times \underline{Ai+1\cdot i+1})$ |
| space ( ) | $= Ai\cdot j \times \underline{Ai+1\cdot j} \times \underline{Ai\cdot i+1} \times \underline{Ai+1\cdot i+1}$ |
| edge (+) | $= (\underline{Ai\cdot j} \times Ai+1\cdot j \times \underline{Ai\cdot i+1} \times \underline{Ai+1\cdot i+1})$ <br> $+ \underline{Ai\cdot j} \times \underline{Ai+1}\cdot j \times Ai\cdot j+1 \times \underline{Ai+1\cdot i+1})$ <br> $+ \underline{Ai\cdot j} \times \underline{Ai+1}\cdot j \times \underline{Ai\cdot j}+1 \times Ai+1\cdot j+1)$ <br> $+ Ai\cdot j \times \underline{Ai+1\cdot j} \times \underline{Ai\cdot j+1} \times Ai+1\cdot j+1)$ <br> $+ (\underline{Ai\cdot j} \times Ai+1\cdot j \times Ai\cdot j+1 \times \underline{Ai+1\cdot i+1})$ <br> $+ Ai\cdot j \times Ai+1\cdot j \times Ai\cdot j+1 \times Ai+1\cdot j+1)$ |

The signal "edge" is used to express cases where the directional information to be conveyed is neither "horizontal", "diagonal right", "diagonal left", "vertical", "body" nor "space".

In order to improve the edge line detecting performance, the pattern conversion based on $3 \times 3$ or $4 \times 4$ square points may by used, depending on needs.

FIGS. 9a and 9b illustrate the outputs which are obtainable by pattern conversion of the external and internal shapes of FIGS. 8a and 8b, respectively, in the manner just described.

After first converting the external shape pattern at the contour portions thereof, edge turns of the external pattern are detected using the converted signals.

Edge turns as discussed herein do not necessarily be actual edge turns but include the so-called imaginary edge turns which do not actually exist.

Figure 5:
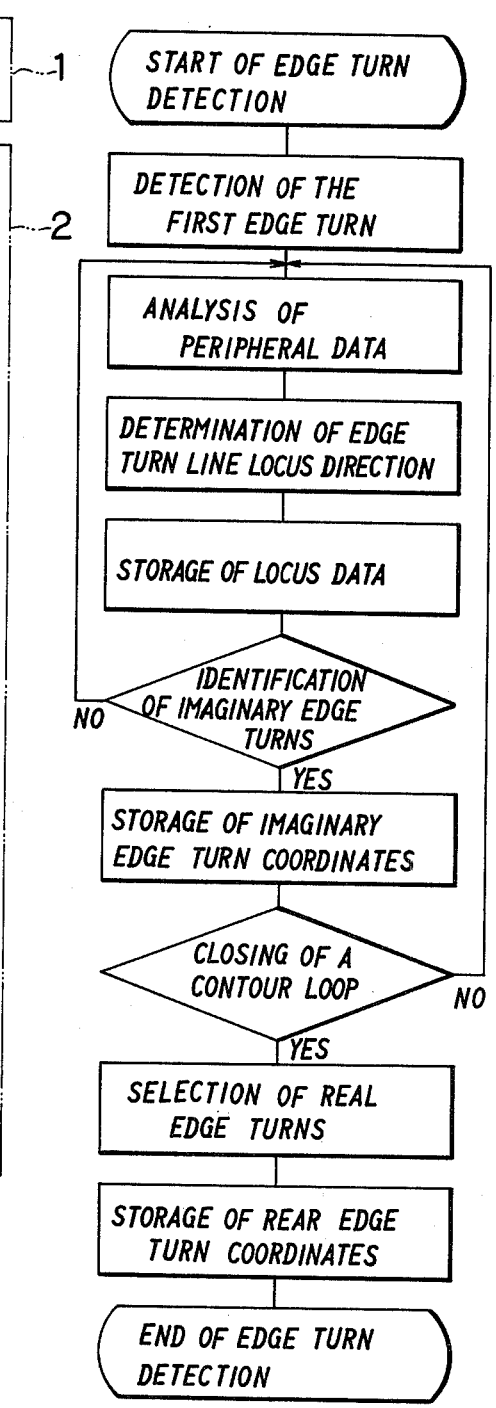
FIG. 5 is a block diagram illustrating the edge turn detection employed in the system of the invention.

When the converted information obtained as above is scanned in accordance with an edge detection illustrated by a flow chart of FIG. 5, an imaginary edge turn is first detected in any case (for instance, the edge at the upper left corner as shown in FIG. 9b). After successively analyzing the converted information in the vicinity of the imaginary edge, that is to say, the first edge, the direction of the edge line locus is determined on the basis of the results thereof. In a case as in FIG. 9b, for instance, the fact that the direction is horizontal is stored in a memory bank of the pattern recognizing unit 2 before proceeding the analysis in the direction of the edge locus. Where the stored locus information is not imaginary, furthermore, the scanning is continued along the locus direction stored in memory, in a successive manner until an imaginary edge turn is reached. Upon finding an imaginary edge turn, the information accumulated so far is stored with the coordinates of the imaginary edge turn. The operation just discussed is continued until a loop around the entire circumference of the shape contour is closed. When the loop is judged as closed, the detected imaginary edge turns are now analyzed as to whether they could be real edge turns based on the information about two adjacent signals thereof. That is to say, if both sides of an imaginary edge turn happen to be horizontal locus signals, for instance, it is apparent that the edge turn cannot be real. When coordinates of real edge turns are stored in the unit, excluding the imaginary edge turns such as above, the edge turn detection is complete.

In the course of edge turn detection of an external shape discussed hereinabove, it sometimes happens that a plurality of edge turns are found at extremely close locations to each other. In some cases, such edge turns may be an identical point and must be judged accordingly. In other words, not all of the edge turns which are found as hereinabove are necessarily real. With this fact in mind, a threshold value as to when a plurality of closely positioned edges are judged to be identical point must be determined. Suitable degree of proximity for judging close edge turns to be a point will depend on the size of an object or a pattern which is being identified. The threshold value can be automatically determined by the shape recognizing unit in the course of edge detection discussed hereinabove based on the size of the object under observation. For coordinates of individual edges are stored in the course of edge detection to facilitate approximate sizing of the pattern from the location of such edge turns, enabling automatic selection of a suitable threshold value under a predetermined formula.

After selection of the threshold value, the stored information regarding the edge turns are examined to see whether any closely located edge turns fall within the selected threshold value. In case of the shape shown in 9a, individual edge turns are sufficiently far apart, thus being determined as real.

The angle of opening is then measured for each edge turn just detected. If a pattern has at least one edge turn with the angle of greater than 180°, it is classified as a concave type while a pattern having edge turns with angles of less than 180° only is classified as a convex type, as discussed already.

The classification into concave or convex type is helpful in detecting approximate shape of a pattern, such as to separate, for instance, a hexagon with a recess such as shown in FIG. 1b from ordinary sexangles.

Since the cognizance of the external shape is now complete, the existence of a cavity or cavities is detected in the next step. Where the shape under observation has a cavity such as in the example shown in FIG. 7, the internal shape thereof (shown in FIG. 8a) is analyzed by the same afore-mentioned process including and following the patternwise conversion. The converted data of an analyzed internal shape are successively erased. If there are a plurality of internal shapes the operation is repeated until data of all the internal shapes are erased.

From the results of detections and identifications discussed hereinabove, various form parameters of a shape or a pattern including the number of sides, lengths of individual sides, a vertical angle, size, the center of gravity, position and posture are given in the form of pattern analysis. Additionally, such information as to the number of internal shapes and the like may be given. One operational cycle of the system of the invention is complete when a pattern analysis with above parameters and information is output by a suitable means of any known type.

The information obtained by the system is useful for controlling many drive mechanisms. When used for assembly of industrial parts, for instance, actuators or other drive mechanisms can be controlled in response to pattern recognition analyses of parts to carry out predetermined assembling operation therewith.

FIG. 10 is a graphic representation of the relationship between the number of sampling meshes and the pattern recognition performance of the present system. In the particular figure, each curve represents the limit of possible cognizance for a particular type of shape. In general, a decrease in the number of sampling meshes causes reduction in pattern cognizance performance. For example, identification of a hexagon requires a minimum sampling meshes of approximately 22. It should be apparent from FIG. 10 that the system of the invention ensures reliable shape recognition with a small number of sampling meshes, thereby significantly shortening the period of time required for shape recognition.

Although the invention has been described in connection with a preferred embodiment, persons having ordinary skill in the art will be able to make various modifications and adaptations in the specifically described embodiment and therefore it should be understood that the invention is limited only by the spirit and scope of the appended claims.

What is claimed is:

1. In a shape recognition system comprising pattern input means for describing shape outline data in terms of binary signals representative of the light intensity of each scanned mesh point; recognition means for converting said binary signals into pattern marking signals of horizontal, right diagonal, vertical, left diagonal, body, space and edge based on adjacent signals in mask logic mesh points; means for recognizing the shape of said pattern marking signals; means for tracking a contour line of said patterns by the use of said pattern marking signals which detect edges in said contour line; means for sequentially recording the number and mesh coordinate of said edges; and means for recognizing the shape of said patterns by comparison of the number of angular turns in said contour line and shape parameters obtained from the number and coordinates of detected edges, the improvement which comprises:

means for physically separating signals of an internal shape and signals of an external shape from the shape to be recognized.

2. A system as defined in claim 1, wherein said means for separating signals comprises:

means for determining a first scanning line ($N = 1$), scanning a binary data pattern of said first scanning line, counting the number of points of variance in the binary signals of said scanning line and recording a maximum variance value of $Ncmax$; and means for sequentially inverting binary signals in said points of variance from the first scanning line ($N =$ 1) to a last scanning line ($N = Nmax$) by inverting signals in the period of variance of even-numbered counts from 0 to 1 and inverting signals in the period of variance of odd-numbered counts from 1 to 0 to form a separated pattern of said internal shape.

3. A system as defined in claim 1, wherein said means for separating signals comprises:

means for determining a first scanning line ($N = 1$), scanning a binary data pattern of said first scanning line, counting the number of points of variance in the binary signals of said scanning line and recording a maximum variance value of $Ncmax$; and means for sequentially inverting binary signals in said points of variance from the first scanning line ($N = 1$) to the last scanning line ($N = Nmax$) by inverting signals in the period of variance of even-numbered counts except for a period of no variance ($Nc = 0$) and the period of last variance ($Nc = Ncmax$) without inverting signals in the period of variance of odd-numbered counts, whereby the internal shape pattern is erased and a separated pattern of the external shape is obtained.

* * * * *